Figure 1:
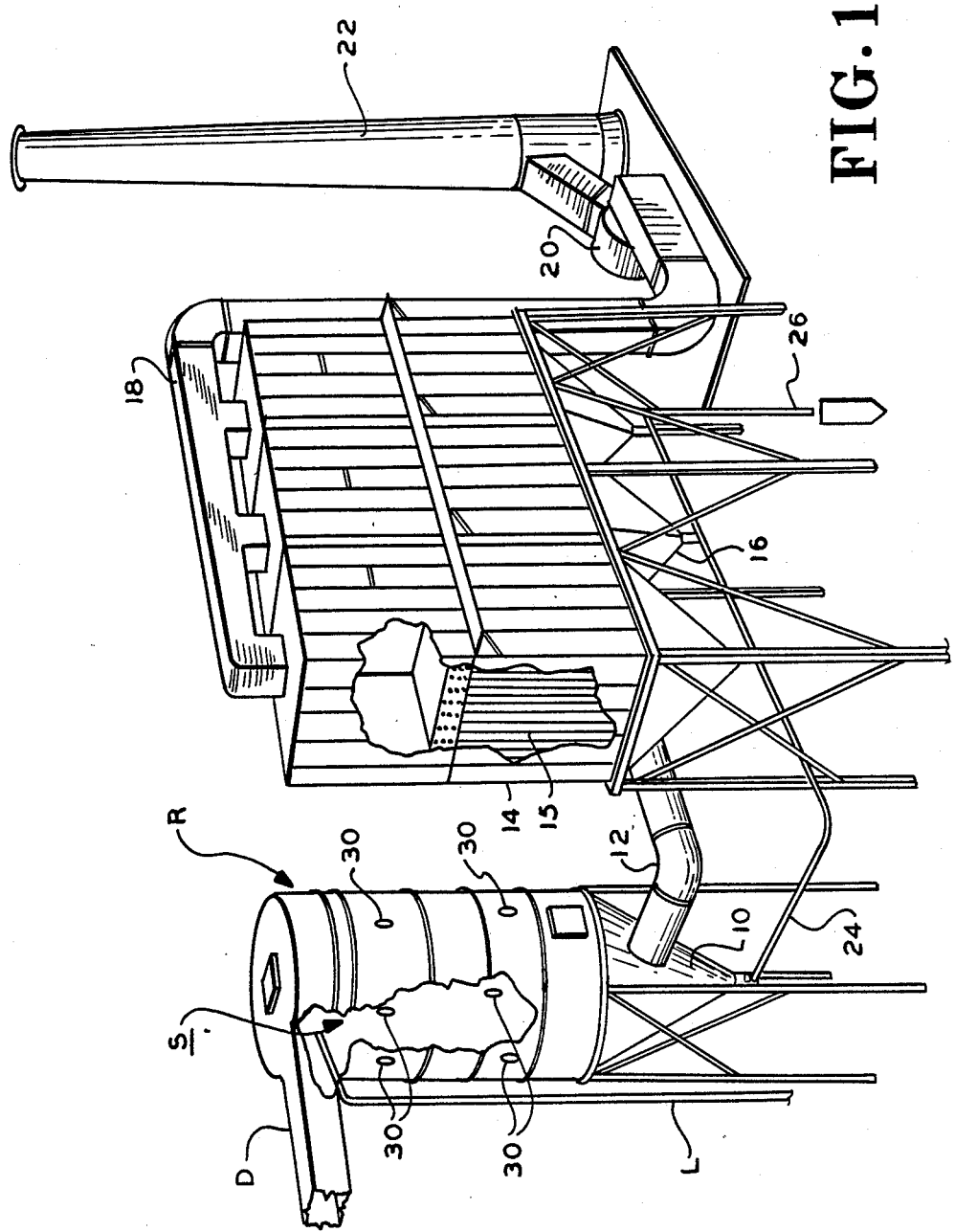

United States Patent [19]

Pfoutz

[11] Patent Number: 4,935,209

[45] Date of Patent: Jun. 19, 1990

[54] REACTION ENHANCEMENT THROUGH ACCOUSTICS

[75] Inventor: Billy D. Pfoutz, Somerville, N.J.

[73] Assignee: Belco Technologies Corporation, Parsippany, N.J.

[21] Appl. No.: 909,158

[22] Filed: Sep. 19, 1986

[51] Int. Cl.[5] .............................................. B06B 1/02
[52] U.S. Cl. ......................................... 422/128; 55/8; 55/10; 55/15; 55/94; 55/126; 55/277; 159/900; 203/99
[58] Field of Search ....................... 422/127, 128, 169; 55/8, 10, 15, 94, 126, 127, 260, 277; 159/900; 203/99

[56] References Cited

U.S. PATENT DOCUMENTS

| | | | |
|---|---|---|---|
| 2,215,484 | 9/1940 | St. Clair | 183/114 |
| 2,265,762 | 12/1941 | McKittrick et al. | 202/39 |
| 2,535,700 | 12/1950 | Seavey et al. | 183/114 |
| 2,576,297 | 11/1951 | Horsley et al. | 159/900 |
| 2,696,892 | 12/1954 | Campbell | 55/121 |
| 3,088,220 | 5/1963 | Ofner | 159/900 |
| 3,175,299 | 3/1965 | Boucher | 159/900 |
| 3,273,631 | 9/1966 | Neuman | 159/900 |
| 3,327,401 | 6/1967 | Stamos et al. | 159/900 |
| 3,389,971 | 6/1968 | Alliger | 23/277 |
| 3,390,869 | 7/1968 | Alliger | 261/17 |
| 3,494,099 | 2/1970 | Eng et al. | 55/8 |
| 3,681,009 | 8/1972 | Horsley | 23/2 R |
| 3,771,286 | 11/1973 | Scott | 55/15 |
| 3,908,904 | 9/1975 | Kerner et al. | 239/4 |
| 4,102,651 | 7/1978 | Kerner et al. | 23/277 R |
| 4,313,920 | 2/1982 | Cooper | 423/449 |
| 4,530,822 | 7/1985 | Ashley et al. | 422/169 |
| 4,590,049 | 5/1986 | Staudinger | 423/244 |

Primary Examiner—Barry S. Richman
Assistant Examiner—Timothy M. McMahon
Attorney, Agent, or Firm—Thomas L. Adams

[57] ABSTRACT

A reactor can apply a reactant to a gas flow that is conveyed through a vessel. The vessel has an inlet and an outlet for receiving and discharging, respectively, this gas flow. Also included is a spray nozzle mounted in the vessel for spraying the reactant therein at a given flow rate. The reactor also includes a horn mounted in the vessel for acoustically vibrating the reactant at an energy level sized to evaporate the reactant substantially completely, prior to reaching the outlet.

8 Claims, 3 Drawing Sheets

REACTION ENHANCEMENT THROUGH ACCOUSTICS

BACKGROUND OF THE INVENTION

The present invention relates to scrubbers and, in particular, to scrubbers having apparatus to enhance evaporation and reactions occurring within the scrubber.

It is known to employ a scrubber to remove pollutants from an exhaust stream. Known dry scrubbers employ a slurry that is sprayed into a reaction vessel. A typical slurry would be $Ca(OH)_2$. The slurry can react with hydrochloric acid, hydrogen flouride, carbon dioxide, sulfur dioxide and other pollutants to produce a particulate that can be dried into a solid plus water vapor.

These known scrubbers take precautions to ensure the proper evaporation rate within the reaction tower. For this reason the droplet size is carefully controlled so that the evaporation does not occur to early (so the reaction is incomplete) or too late (so wet slurry leaves the reaction vessel).

It is known to use an electric horn to enhance the separation of phases. For example, it has been suggested that a distillation process can be enhanced by establishing sonic vibrations within the distillation column. Analysis suggests that these vibrations increase the rate of interchange between liquids and another fluid phase. However, this technology has not been successfully applied to controlling the evaporation and reaction of droplets in a dry scrubber.

It has also been suggested that sulfuric acid containing waste, can be effectively cracked in a furnace by forming it into a mist that is vibrated ultrasonically by an atomizer that causes vibrations as it atomizes. Such technology, however, is quite different from dry scrubbers and was designed primarily to increase cracking yield, not control evaporation. Furthermore there is no suggestion in this technology how these sonic vibrations ought to be applied in a scrubber.

It has been suggested (U.S. Pat. No. 3,389,971) that a high speed mist can be injected across the path of chimney gas. That system passes a high speed mist into a side outlet to be dumped into a waste tank. This prior art suggests injecting air and water to produce an ultrasonic whistle. The mist so produced, however, is merely water and does not include sorbent. Thus this reference has little relevance to the complicated processes involved in dry scrubbers.

SUMMARY OF THE INVENTION

In accordance with the illustrative embodiments demonstrating features and advantages of the present invention, there is provided a reactor for applying a reactant to a gas flow. The reactor has a vessel for conveying this gas flow. The vessel has an inlet and an outlet for receiving and discharging, respectively, the gas flow. Also included is a spray means mounted in the vessel for spraying therein the reactant at a given flow rate. The reactor also includes a horn means mounted in the vessel for acoustically vibrating the reactant at an energy level sized to evaporate the reactant substantially completely, prior to reaching the outlet.

A method also in accordance with the principles of the same invention employs a vessel for applying a sorbent to a gas containing pollutants. The method includes the step of passing the gas through the vessel. Another step is spraying the sorbant into the gas flowing in the vessel. The method also includes the step of acoustically vibrating the sorbent after spraying, to evaporate the sorbent substantially completely before it leaves the vessel.

By employing apparatus and methods of the foregoing type an improved scrubber can be achieved in a preferred embodiment. This preferred embodiment acts as a dry scrubber and has a plurality of upwardly directed sprayers mounted at the bottom of a reaction vessel. The vessel, typically cylindrical, has a number of sonic horns equally spaced along the periphery of the vessel at a predetermined height. In a preferred embodiment an additional set of horns is placed at a second height. For example, a trio of horns can be placed one fourth and one-half of the way up the reaction vessel.

By employing such sonic enhancements, the droplets sprayed into the vessel can be agitated to disperse the vapor that normally surrounds an evaporating droplet. Consequently the evaporation and reaction rate of the particles can be controlled by the sonic horns.

BRIEF DESCRIPTION OF THE DRAWING

The above brief description as well as other features and advantages of the present invention will be more fully appreciated by reference to the following detailed description of a presently preferred but nonetheless illustrative embodiment in accordance with the present invention when taken in conjunction with the accompanying drawings, wherein:

FIG. 1 is a perspective view of a flue gas treatment system, employing a reactor according to the principles of the present invention;

FIG. 2 is an elevational view of a reactor which is an alternate to that illustrated in FIG. 1;

FIG. 3 is a side view of the separator of FIG. 2; and

FIG. 4 is a cross sectional view along lines 4-4 of FIG. 2.

FIG. 5 is a perspective view of a flue gas treatment system, which is an alternate to that of FIG. 1 and which employs an electrostatic precipitator in place of the conventional type of fabric filter.

DETAILED DESCRIPTION OF THE PREFERRED EMBODIMENTS

Referring to FIG. 1, a typical exhaust processing system is illustrated. A coal-fired (or a municipal solid waste) boiler (not shown) produces a flue gas which is shown entering through duct D a spray-type dryer reactor R. Such dryer reactors (absent the novel feature described presently) are commercially available, for example, from Koch Engineering Company Inc., New York, N.Y. The reactor R is shown having a inlet line L which delivers a slurry, for example, $Ca(OH)_2$, although other commonly used slurries may be substituted therefor. The slurry may be formed in the usual manner by mixing and pumping a dry reactant with water. As shown in this embodiment reactor R can employ a spray nozzle S which sprays the slurry downwardly through the reactor vessel R. The downward spray is in the same direction as the flue gas flow. While one spray nozzle S is illustrated, it will be appreciated that in practical embodiments more than one spray head will be employed. Nozzle S is designed to produce droplets in the range of 20 to 80 microns.

The bottom portion of the reactor R is formed into a conical section 10 which communicates with an outlet duct 12 conducting the scrubbed flue gas. The outlet duct 12 feeds the inlet of fabric filter (bag house) 14 of a conventional type. The fabric filter 14 is designed to collect entrained dry particles that may remain in the flue gas after passing through reactor vessel R. The output of filter 14 is fed through upper ducts 18 to forced draft fan 20 feeding stack 22.

Reactor R has a lower outlet pipe 24 for receiving the dry waste product produced by the reactor. Pipe 24 also communicates with the dry waste collected in the hoppers 16 of fabric filter 14. Accordingly, the dry wastes flow in pipe 24 to be removed through waste outlet 26.

In this embodiment there are two trios of sonic horns 30 mounted through the wall of reactor vessel R. Preferably, these sonic horns 30 are capable of a power output of 25 dB per horn. For most applications the frequency ought to be in the range of 2 to 20 kHz, although, 8 kHz is typical. It will be understood, however, that the power output and frequency can be varied depending upon the type of contaminants, the flow rate, temperature etc. These parameter are to be set to produce full but not premature evaporation of the slurry/reactant.

It is important to set the power and frequency to ensure that the sorbant droplets are completely evaporated before leaving the reactor vessel. By setting the power and frequency in this fashion, the droplets are made to vibrate, causing the layer of vapor normally surrounding the droplet to disperse. This reduces the partial vapor pressure around the droplet and aids in full evaporation and reaction.

Figure 2:
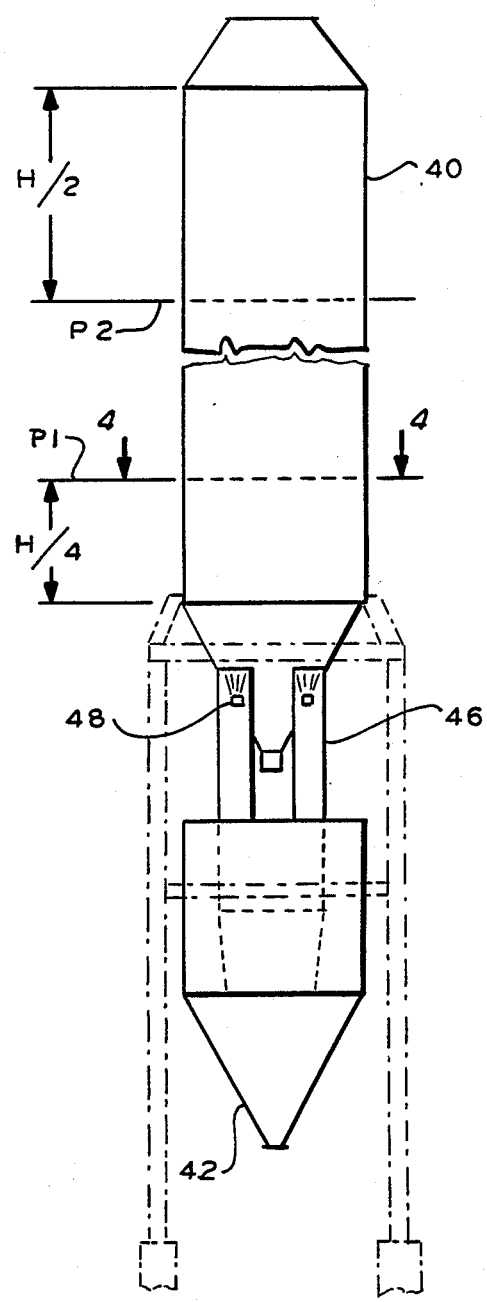
Figure 4:
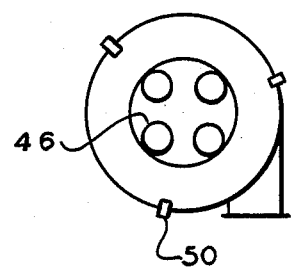
Figure 3:
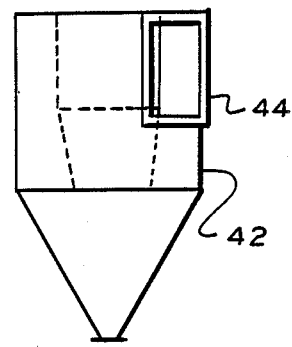

Referring to FIGS. 2, 3, and 4, an alternate embodiment is shown, employing a reactor vessel 40 in which the flue gas and sorbent both flow upwardly. The flue gas enters through a cyclonic separator 42 having an inlet 44. The cyclonic separator 42 is designed to produce a spinning gas flow that drives heavier entrained particles to the outside wall where they are decelerated and fall through the lower conical hopper of the separator 42.

Flue gas leaving separator 42 flows upwardly through a plurality of equiangularly spaced flow tubes 46. Flow tubes 46, in this embodiment, are four in number and each have centrally placed therein a spray nozzle 48 of the usual design. Spray nozzle 48 delivers a slurry similar to that employed by the scrubber of FIG. 1.

Accordingly, an upwardly directed mist is mixed with flue gas to flow upwardly through reactor vessel 40. In this embodiment, two trios of sonic horns are used. At approximately 25% of the height of reactor vessel 40 (position P1) there are included, at equiangularly spaced positions, three sonic horns 50. The horns 50 have the power and frequency of the horns previously described in connection with FIG. 1. Similar horns are placed at position P2 at 50% of the height of the reactor vessel 40.

In the same manner as before, the horns 50 can agitate the droplets from nozzle 48 to enhance evaporation. Eventually a completely evaporated gas having entrained particles leaves the top of reactor vessel 40 to be further cleansed by a fabric filter, an electrostatic precipitator or other device.

Figure 5:
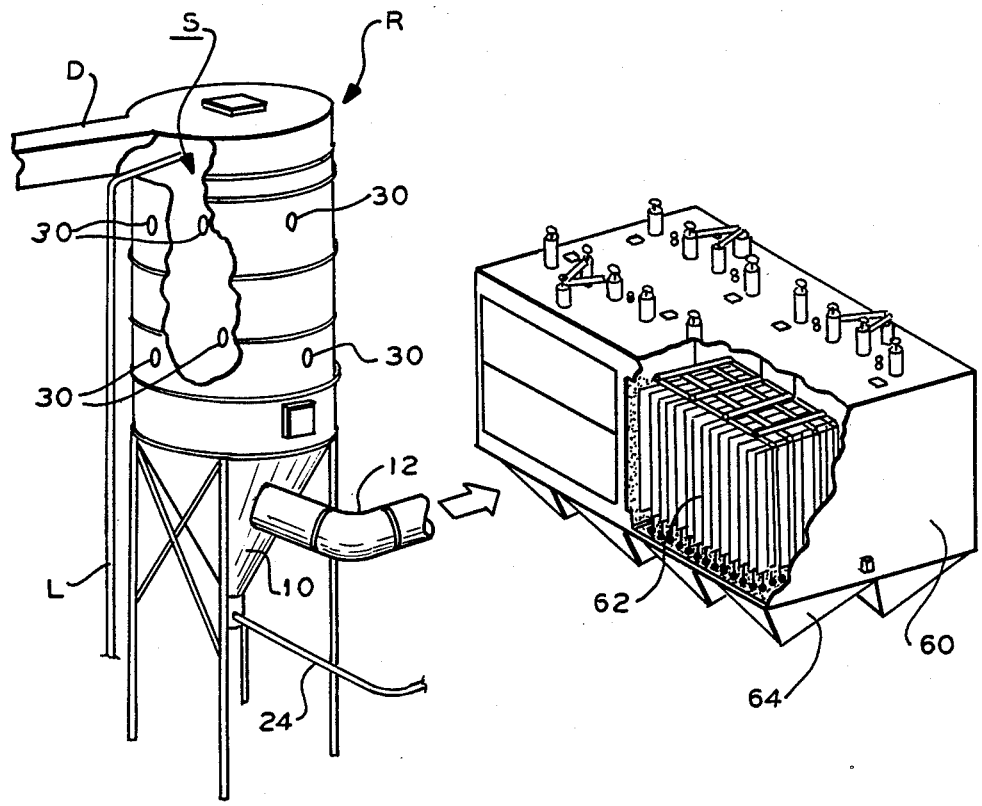

Referring to FIG. 5, it shows previously mentioned reactor R feeding an electrostatic precipitator 60 through outlet duct 12. Precipitator 60 is a commercially available unit designed to receive scrubber output. Precipitator 60 has a high voltage power supply (not shown) that produces an intense electrical field between the electrified elements 62 of the precipitator. Accordingly, particles collect on one of the elements 62 and eventually fall into collecting bins 64 for removal. The output of the precipitator is fed as before to ducts 18 and fan 20 to stack 22.

It will be appreciated that modifications may be implemented with respect to the above described preferred embodiments. For example, the type of scrubber employed can be varied, and any of the scrubbers known to the industry may be fitted with sonic horns as herein described. It will also be appreciated that the position of the horns can be changed. While two trios of equally spaced horns were illustrated, in some embodiments the horns may be distributed differently. Furthermore the number of horns can be changed, depending upon the evaporation rate required. Furthermore the size and shape of the reactor vessel can be altered depending upon the system demands. Additionally various techniques for producing sonic energy can be employed.

Obviously, many modifications and variations of the present invention are possible in light of the above teachings. It is, therefore, to be understood that within the scope of the appended claims, the invention may be practiced otherwise than as specifically described.

What is claimed is:

1. A reactor for applying a reactant of solid particles or a slurry of solid particles to a flue gas flow, comprising:

a vessel for conveying said flue gas flow and having an inlet and an outlet for receiving and discharging, respectively, said flue gas flow, said vessel being structured to permit said flue gas to travel through said vessel in a predetermined flow direction, said vessel having at least in past, a cylindrical shape;

a spray means mounted in said vessel for spraying therein said reactant, to mix and chemically react with said flue gas flow, said reactant being sprayed at a given flow rate to produce a mixture tending to equilibrate above its saturation temperature;

a horn means mounted in said vessel for acoustically vibrating said mixture at an energy level sized to evaporate said mixture substantially completely just prior to reaching said outlet to dry said solid particles, thereby controlling the evaporation rate and reaction time of said mixture, said horn means being located downstream from said spray means to inject acoustic energy in a direction transverse to said flow direction, thereby precisely controlling the evaporation rate of said mixture, said horn means comprising a plurality of spaced acoustic drivers mounted in said vessel between said inlet and said outlet, each of said drivers are structured to have an output characteristic sufficient to produce a vibration not less than 2 kHz and not greater than 20 kHz, said drivers being arranged in at least two tiers, said drivers in each tier being spaced equiangularly, said horn means being structured to produce a predetermined energy level, said reactant comprising a slurry for reacting with pollutants, said predetermined energy level being sized to convert said slurry after reacting with said pollutants in to water vapor and particulate; and an electrostatic precipitator coupled to the outlet of said vessel for removing said particulate from said flue gas.

2. A reactor according to claim 1 wherein said spray means has a nozzle sized to spray said reactant at a droplet size of not less than 20 and not greater than 80 microns.

3. A reactor according to claim 1 wherein said horn means is located downstream from said inlet at least one fourth of the distance to said outlet.

4. A reactor according to claim 1 wherein said horn means is located downstream from said inlet at least one fourth of the distance to said outlet.

5. A reactor according to claim 4 wherein one of said two tiers is located downstream from said inlet at least one half of the distance to said outlet.

6. A reactor according to claim 1, wherein each of said drivers are structured to have an output characteristic sufficient to produce a vibration of 8 kHz.

7. A reactor according to claim 6 wherein each of said drivers is electrically driven and produces vibrations at a level of about 25 dB.

8. A reactor according to claim 6 further comprising:
a cyclonic separator coupled to the inlet of said vessel for separating particles in said gas.

* * * * *